(12) United States Patent (10) Patent No.: US 9,136,683 B2
Hyde et al. (45) Date of Patent: Sep. 15, 2015

(54) ADJUSTABLE SUSPENSION OF TRANSMISSION LINES

(75) Inventors: Roderick A. Hyde, Redmond, WA (US); Jordin T. Kare, Seattle, WA (US); Lowell L. Wood, Jr., Bellevue, WA (US)

(73) Assignee: ELWHA LLC, Bellevue, WA (US)

( * ) Notice: Subject to any disclaimer, the term of this patent is extended or adjusted under 35 U.S.C. 154(b) by 303 days.

(21) Appl. No.: 13/552,531

(22) Filed: Jul. 18, 2012

(65) Prior Publication Data

US 2014/0021308 A1 Jan. 23, 2014

(51) Int. Cl.
*H02G 7/05* (2006.01)
*F16L 3/00* (2006.01)
*H02G 7/12* (2006.01)

(52) U.S. Cl.
CPC .............. *H02G 7/12* (2013.01); *Y10T 29/49826* (2015.01)

(58) Field of Classification Search
CPC .............. H02G 7/08; H02G 7/12; F16L 13/00
USPC .......... 248/58, 59, 60, 61, 63, 636; 174/40 R, 174/41, 42, 43, 40 TD, 40 CC, 146
See application file for complete search history.

(56) References Cited

U.S. PATENT DOCUMENTS

| | | | |
|---|---|---|---|
| 1,336,503 A * | 4/1920 | Brown et al. ................... | 191/41 |
| 1,448,141 A * | 3/1923 | Manz et al. ...................... | 191/41 |
| 1,592,369 A | 7/1926 | Jorstad | |
| 1,668,346 A * | 5/1928 | Varney ........................... | 191/40 |
| 3,032,605 A * | 5/1962 | Gerlach et al. ............. | 174/128.1 |
| 3,128,858 A * | 4/1964 | Kumezana ..................... | 191/41 |
| 3,139,482 A * | 6/1964 | Peters et al. .................. | 174/160 |
| 4,011,397 A | 3/1977 | Bouche | |
| 4,013,826 A | 3/1977 | Herzig | |
| 4,069,765 A | 1/1978 | Müller | |
| 4,346,255 A * | 8/1982 | Nigol ............................. | 174/42 |
| 4,458,102 A | 7/1984 | White | |
| 4,464,665 A | 8/1984 | Watts, Jr. | |
| 4,592,369 A * | 6/1986 | Davis et al. .................. | 600/546 |
| 4,606,082 A | 8/1986 | Kuhlman | |
| 4,937,568 A | 6/1990 | Nakanishi et al. | |

(Continued)

FOREIGN PATENT DOCUMENTS

| CN | 201829897 U | 5/2011 |
|---|---|---|
| DE | 2129843 | 12/1972 |

(Continued)

OTHER PUBLICATIONS

PCT International Search Report; International App. No. PCT/US2013/050902; Dec. 13, 2013; pp. 1-2.

*Primary Examiner* — Angel R Estrada
*Assistant Examiner* — Dimary Lopez Cruz

(57) ABSTRACT

A support system for supporting one or more transmission lines and for mitigating sagging or swinging of the transmission lines may comprise support lines coupled to the transmission lines by adjustable risers. The adjustable risers may be dynamically adjustable in length to compensate for the sagging or swinging of the transmission lines. Various embodiments of the adjustable risers, support lines, and support system are contemplated. These embodiments may include adjustment mechanisms, sensors, shock absorbers, positioning mechanisms, zero gap connections, guy wires, lateral members, and various different arrangements of the elements.

5 Claims, 16 Drawing Sheets

(56) References Cited

U.S. PATENT DOCUMENTS

| | | | |
|---|---|---|---|
| 5,682,447 A | 10/1997 | Kuzyk et al. | |
| 5,711,143 A | 1/1998 | Munakata et al. | |
| 5,789,701 A | 8/1998 | Wettengel et al. | |
| 5,792,983 A | 8/1998 | Shirmohamadi | |
| 6,180,232 B1 | 1/2001 | McCullough et al. | |
| 6,191,354 B1 * | 2/2001 | Castano et al. | 174/40 R |
| 6,728,987 B1 | 5/2004 | Hinman | |
| 6,864,421 B1 | 3/2005 | Shirmohamadi | |
| 7,416,005 B2 | 8/2008 | Hennig et al. | |
| 2008/0099226 A1 | 5/2008 | Goch | |
| 2009/0083956 A1 | 4/2009 | Ulfik et al. | |
| 2009/0169379 A1 | 7/2009 | McClintic | |
| 2010/0038112 A1 | 2/2010 | Grether | |
| 2010/0172618 A1 | 7/2010 | Lapp | |
| 2010/0192758 A1 | 8/2010 | Clough | |

FOREIGN PATENT DOCUMENTS

| | | |
|---|---|---|
| EP | 1 847 816 B1 | 10/2007 |
| WO | WO 01/76034 A2 | 10/2001 |

\* cited by examiner

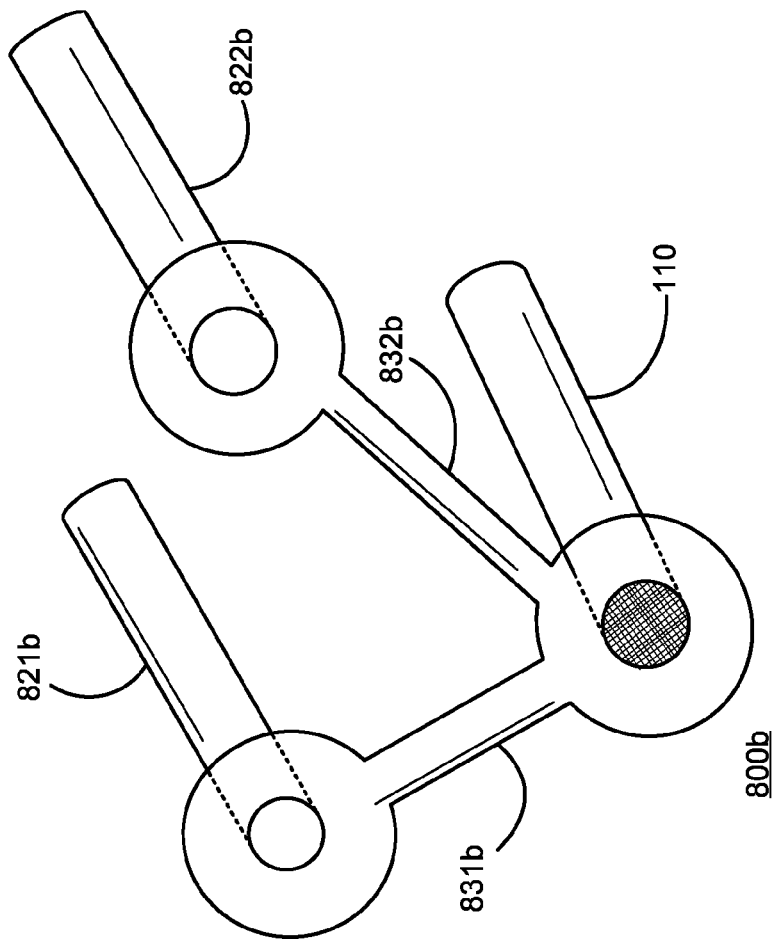
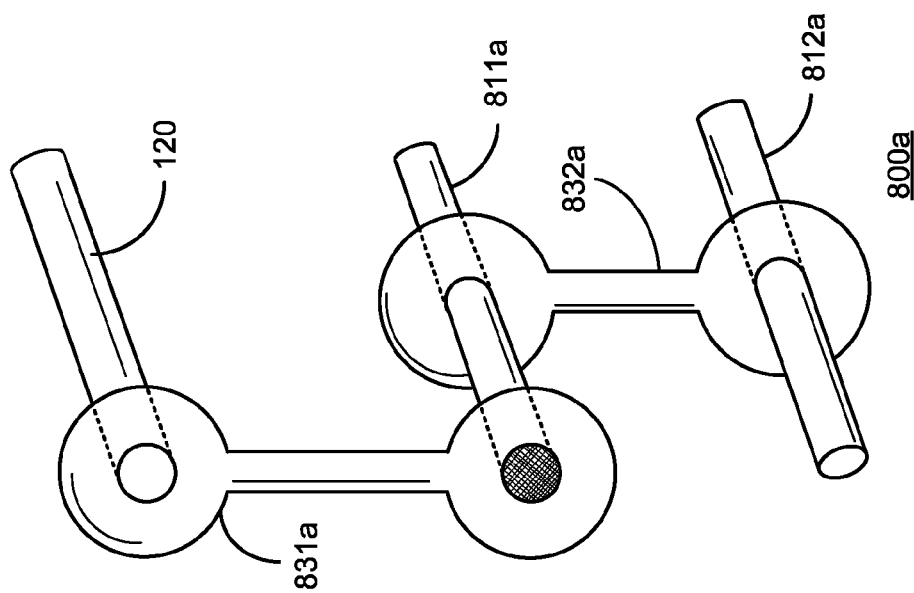
FIG. 8B
FIG. 8A

ADJUSTABLE SUSPENSION OF TRANSMISSION LINES

TECHNICAL FIELD

This disclosure relates to systems and methods for supporting transmission lines to mitigate sagging or swinging of the transmission lines.

SUMMARY

Transmission lines may sag or swing due to wind, external heat, Joule heating due to current flow, or the like. This may cause damage to the transmission lines and/or transmission system, such as when the transmission lines come in contact with foliage or structures. Support systems may be used to mitigate the sagging or swinging and thereby prevent damage and reduce maintenance costs.

Embodiments of the support systems disclosed herein include support lines for supporting one or more transmission lines. The support lines may be at a higher tension than the transmission lines and have a low or negative thermal expansion coefficient to minimize their own sagging. The support lines may be coupled to the transmission lines by adjustable risers. The adjustable risers may be dynamically adjusted in length to compensate for sagging or swinging of the transmission lines. This may include adjusting the length out of phase with the swinging and/or reducing the length of the adjustable risers when sagging increases. The adjusting may be controlled locally, or the adjustable riser may receive commands from external sources.

In certain embodiments, sensors may measure the sag or swinging of a transmission line or conditions that may create sagging or swinging. Shock absorbers may be used to reduce swinging and absorb kinetic energy from the system. Positioning mechanisms may allow the position of the adjustable risers to be dynamically adjusted as well. To further reduce sagging or swinging, the transmission line may be connected to the support line with a zero gap connection at an intermediate support point. Guy wires may be used to provide tension to the support line or to provide additional stability, such as at the intermediate support point.

For systems with multiple support lines and/or multiple transmission lines, many different arrangements are possible. A single support line may support multiple transmission lines, or a single transmission line may be supported by multiple support lines. Some embodiments may comprise transmission lines supported by multiple support lines as well as support lines supporting multiple transmission lines. To prevent contact between transmission and/or support lines and provide additional stability, lateral members may be disposed between support lines and/or transmission lines.

BRIEF DESCRIPTION OF THE DRAWINGS

FIGS. 8A-D are cross-section views of various arrangements of support lines and transmission lines in support systems.

DETAILED DESCRIPTION OF PREFERRED EMBODIMENTS

An overhead transmission line, like any line suspended in a gravitational field, will sag under its own weight between the points of suspension. The sag can be defined as the distance from the ground or the deviation of the transmission line from a straight line between the points of suspension. Sag is defined herein to be increasing when the deviation from the straight line grows and the distance to the ground shrinks. When the transmission line sags, it can come in contact with foliage, such as trees, bushes, and the like. The foliage then acts as a relative short to ground, causing damage to transmission equipment and power outages. Wind can cause swinging of transmission lines and also result in contact with foliage. To avoid contact with the foliage due to sagging or swinging, power companies engage in expensive foliage trimming and maintenance.

How far the line sags is directly related to the length of the cable between the suspension points and inversely related to the tension between the suspension points. When the transmission line is hot, the length will increase in accordance with the thermal expansion coefficient of the transmission line material, and the sag will increase. As a result, the transmission line will sag further when environmental temperatures rise or when a large current increases the temperature of the transmission line due to Joule heating. This results in a larger clearance area being required to avoid contact with foliage.

The sag of the transmission line and the effects of temperature change can be reduced by increasing the tension of the transmission line. However, the conductive materials used for transmission lines have limited tensile strength. A high tensile strength material and/or a material with a negative thermal expansion coefficient can reduce the effects of sagging, but many of these materials are not conductive enough to be used as a transmission line. By separating the conducting functionality from the support functionality, materials can be used that excel at each function.

Figure 1A:
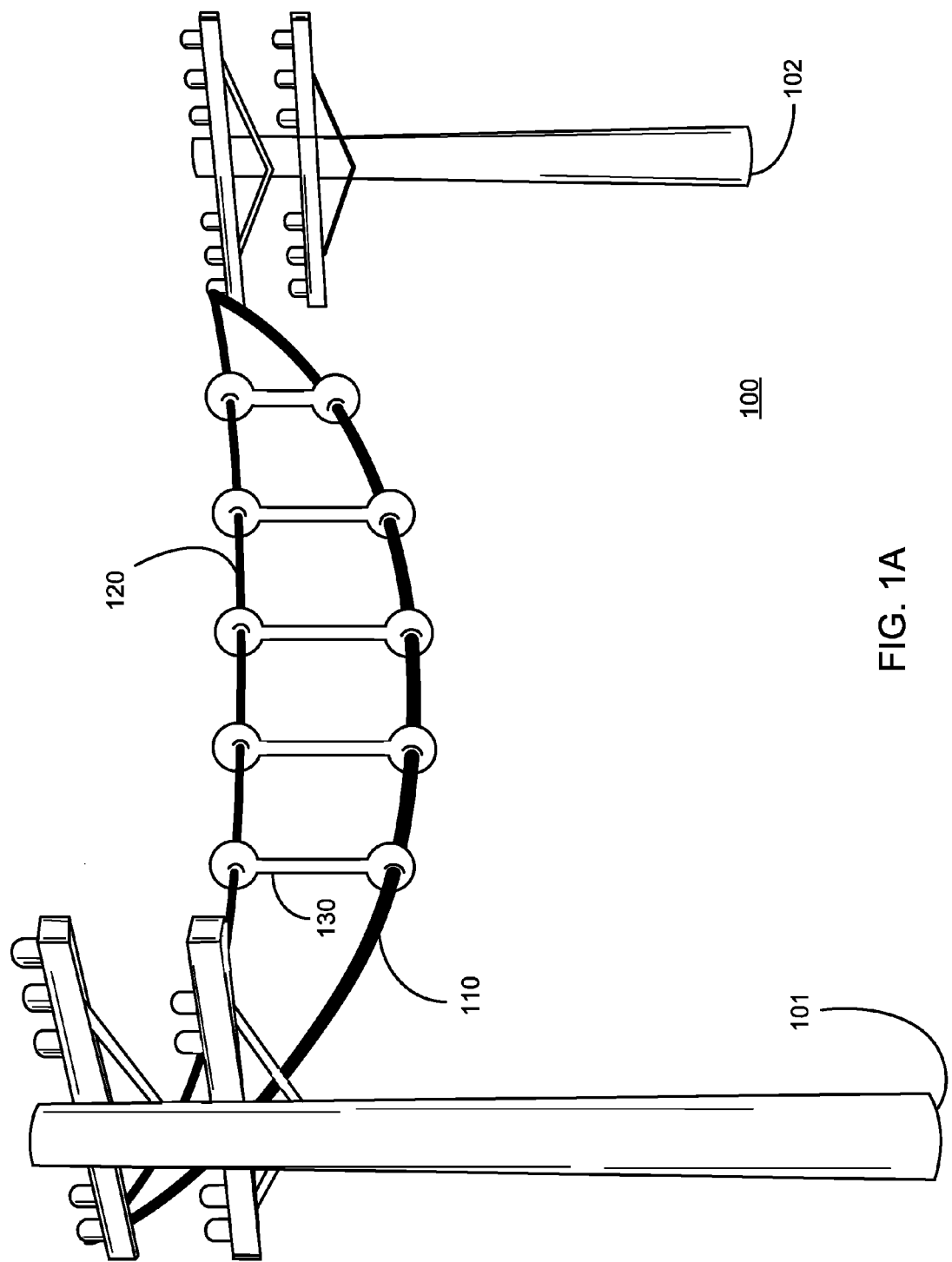
FIGS. 1A and 1B are side and cross-section views of a transmission line support system for mitigating sagging or swinging of a transmission line.
Figure 1B:
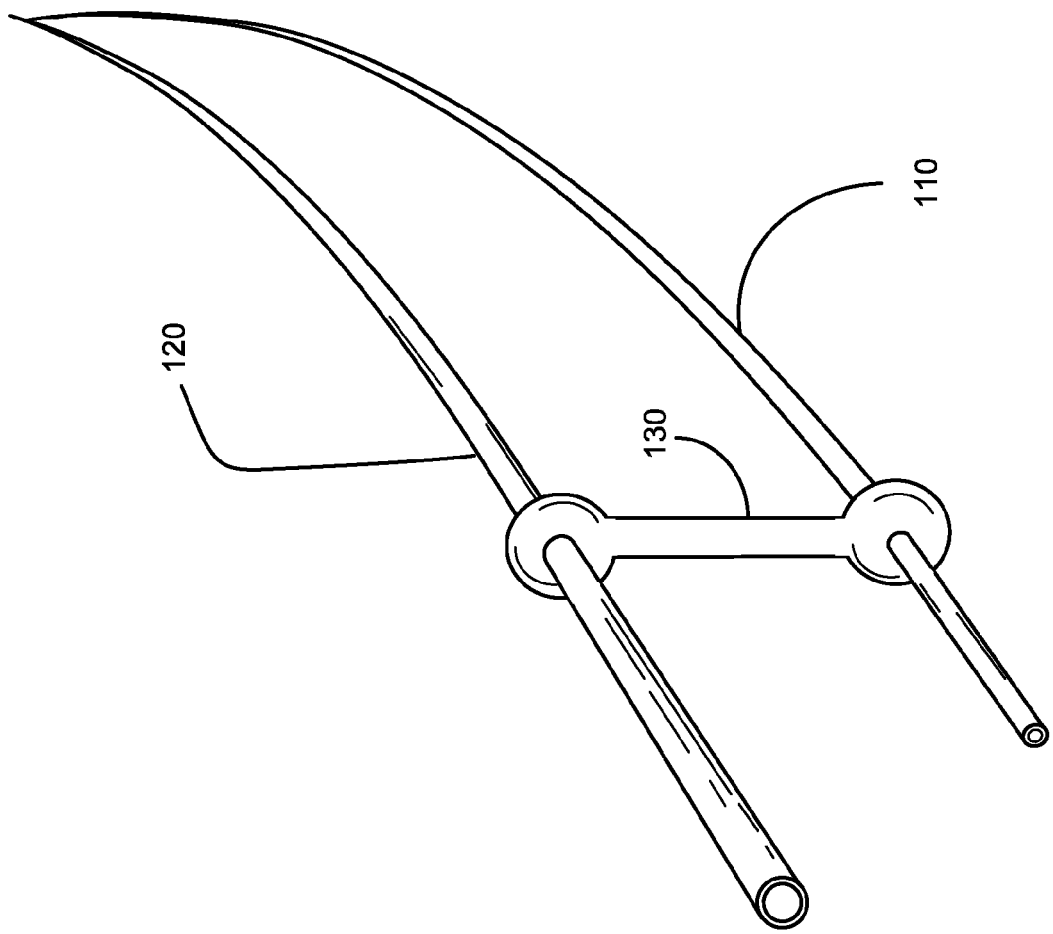

FIGS. 1A and 1B are side and cross-section views of a system 100 that can mitigate sagging or swinging of a transmission line 110. The transmission line 110 is suspended from a support line 120 by a plurality of adjustable risers 130. The illustrated support line 120 is substantially parallel to the transmission line 110. Both the transmission line 110 and the support line 120 may be attached to support towers 101, 102, such as telephone poles, transmissions towers, or the like. In the illustrated embodiment, both the support line 120 and the transmission line 110 are attached to the support towers 101, 102 at the same points. In other embodiments, the transmission line 110 and the support line 120 may be attached at different points.

The support line 120 and adjustable risers 130 may be configured in various embodiments to reduce the amount of swinging, the amount of sag, and/or the variations in sag due to wind, temperature, current fluctuations, and the like. In the illustrated embodiment, the support line 120 is at a higher tension than the transmission line 110 and therefore sags less than the transmission line 110. The adjustable risers 130 allow the support line 120 to support the weight of the transmission line 110 and reduce the sag and swinging of the transmission line 110. The adjustable risers 130 may be dynamically adjusted in length to compensate for the additional sagging during high temperature and/or high current situations. Additionally, the adjustable risers 130 divide the transmission line 110 into smaller segments with closer support points, which limits the sagging of any of the smaller segments.

Many different embodiments of adjustable risers 130 are contemplated. For example, various materials may be used in the adjustable risers 130. The adjustable risers 130 may comprise flexible materials in some embodiments and rigid materials in others. The adjustable risers 130 may comprise a material having a Young's modulus over 10, 100, 500, or 1000 gigapascal (GPa). Alternatively or additionally, the adjustable risers 130 may comprise an elastic material having a Young's modulus less than 10, 5, 1, or 0.5 GPa. Materials may be selected to have a high tensile strength and/or a high compressive strength. The material may be selected so the adjustable riser 130 can be configured to have a large moment of inertia. Exemplary materials include, but are not limited to: metals, such as steel, aluminum, and titanium; polymers, such as polyamides, ultra-high-molecular-weight polyethylene, polybenzoxazoles, and carbon-fiber-reinforced polymers; other inorganic compounds, such as boron nitride, aluminum (III) oxide, and fiberglass; and carbon fiber.

The length of the adjustable risers 130 may be varied using any of several different adjustment mechanisms. In some embodiments, the adjustable riser 130 may comprise a material with a negative thermal expansion coefficient over the operational temperature range; these may comprise selected inorganics, polymers, or inorganic fillers within polymers. Examples of materials with negative thermal expansion coefficients are discussed in Sleight, Isotropic Negative Thermal Expansion, Annu. Rev. Mater. Sci. 28, p. 29 (August 1998) and Mukherjee et al., Reversible Negative Thermal Expansion of Polymer Films, Physical Rev. E 66, 061801 (December 2002), which are incorporated by reference. As the environmental temperature rises, the adjustable risers 130 shrink in length to compensate for the increase in length of the transmission line 110. The negative thermal coefficient may be selected to be correlated with the thermal expansion coefficient of the transmission line 110 such that an average and/or maximum sag of the transmission line 110 is kept constant. In other embodiments, the thermal expansion coefficient of the adjustable riser 130 may be selected to be smaller than the thermal expansion coefficient of the transmission line 110.

Similarly, a shape memory alloy may be used to adjust the length of the adjustable risers 130. The shape memory alloy may be configured to reduce the length of the adjustable riser when a transition temperature is exceeded and the shape memory alloy enters its austenite phase. Again, this compensates for the increased length of the transmission line 110 at higher temperatures.

Figure 2B:
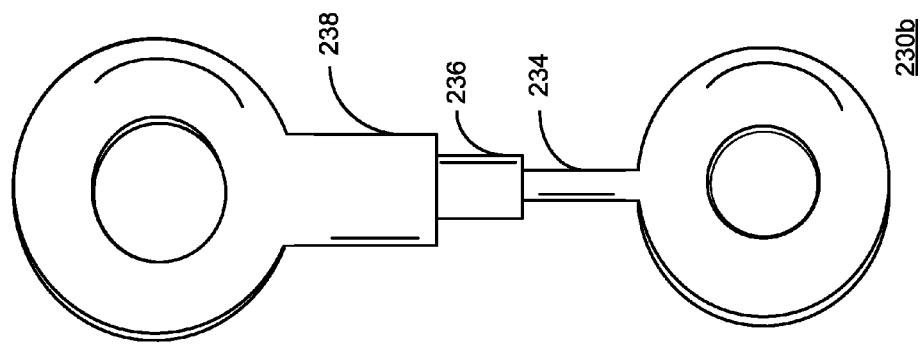
FIGS. 2A-E are side views of mechanical adjustment mechanisms that may be used to adjust the length of the adjustable risers.
Figure 2A:
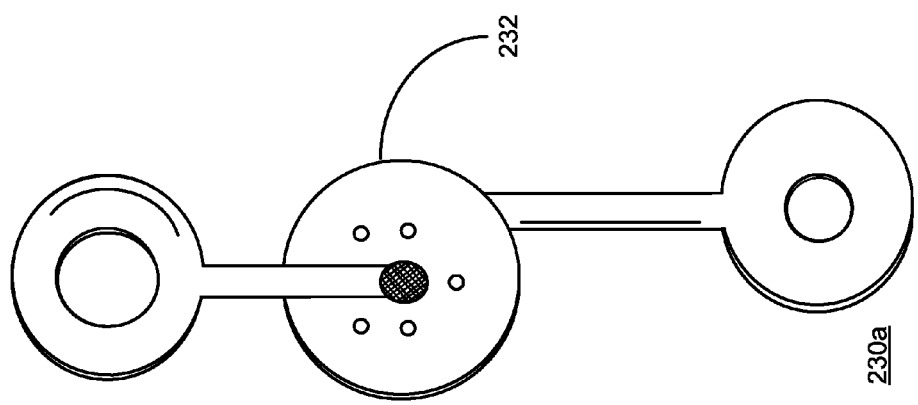

FIGS. 2A-E are side views of mechanical adjustment mechanisms that may be used to adjust the length of the adjustable risers 230a-e. Each adjustment mechanism may be shortened in length to compensate for increased sagging or swinging. The process can then be reversed when the conditions giving rise to the sagging or swinging have dissipated. In FIG. 2A, the adjustable riser 230a comprises a reel 232. The adjustable riser 230a also comprises a flexible material that may be wound onto the reel 232 to change the length of the adjustable riser 230a.

FIG. 2B is a side view of an alternative adjustable riser 230b comprising a plurality of telescoping linkages 234, 236, 238. The telescoping linkages 234, 236, 238 may be collapsed inside one another to reduce the length of the adjustable riser 230b. In some embodiments, the telescoping linkages 234, 236, 238 may be locked into a fixed position by twisting. In other embodiments, the telescoping linkages 234, 236, 238 may be controlled hydraulically or with a motor and may not need to be locked to prevent adjustment.

Figure 2D:
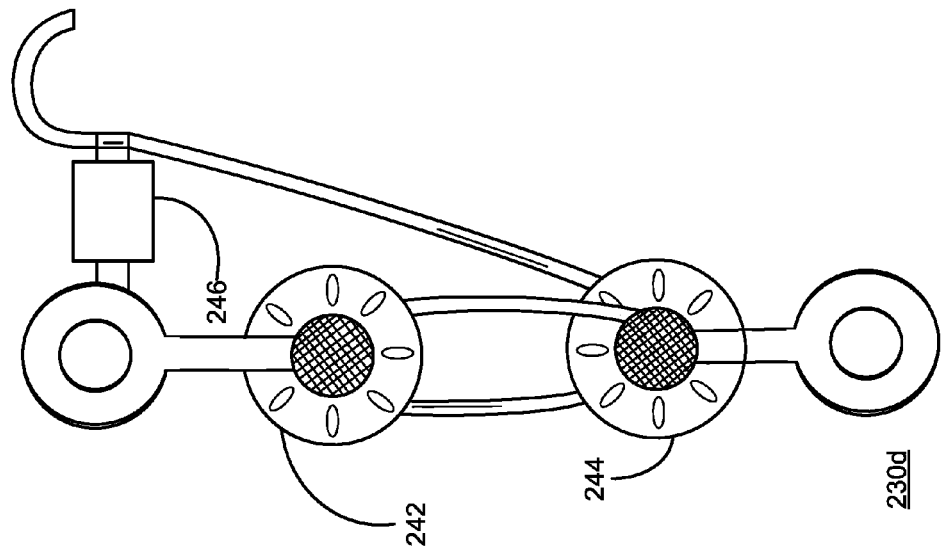
Figure 2C:
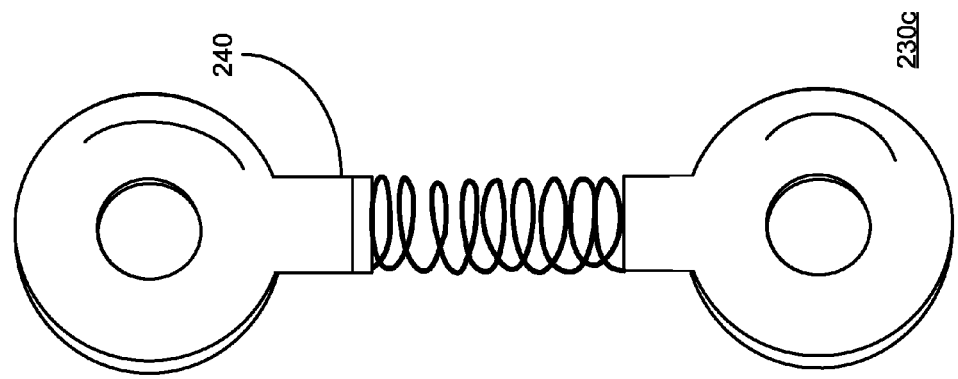

FIG. 2C is a side view of an embodiment in which an adjustable riser 230c is configured to reduce in length when twisted. The illustrated embodiment includes a single helix shaped element 240. More than one helix, such as a double helix shaped element, may also be used. In other embodiments, a nut and bolt combination or another threaded mechanism may be used to change the length of the adjustable riser when it is twisted.

FIG. 2D is a side view of a pulley system for adjusting the length of an adjustable riser 230d. The adjustable riser 230d may comprise one or more pulleys 242, 244. The pulleys may be coupled to the support line and/or the transmission line. The adjustable riser 230d may also comprise a line, such as a rope, cable, or the like, engaged with each pulley by being looped about the pulley's circumference one or more times. The line may be fed through the pulleys to increase or decrease the length of the adjustable riser 230d. The pulleys can be configured to provide a desired mechanical advantage, which may allow less force to be used when adjusting the length of the adjustable riser 230d.

In some embodiments, a motor 246, such as a stepper motor or a servo motor, may be used to control adjustments to the adjustable risers 230a-d. The motor 246 may provide a rotational force when used with adjustable risers 230a,c. The force from the motor 246 may also be translated into a linear force, such as for adjustable risers 230b,d. The motor 246 may be powered by the transmission line, or a separate wire may be used to power the motor 246.

Figure 2E:
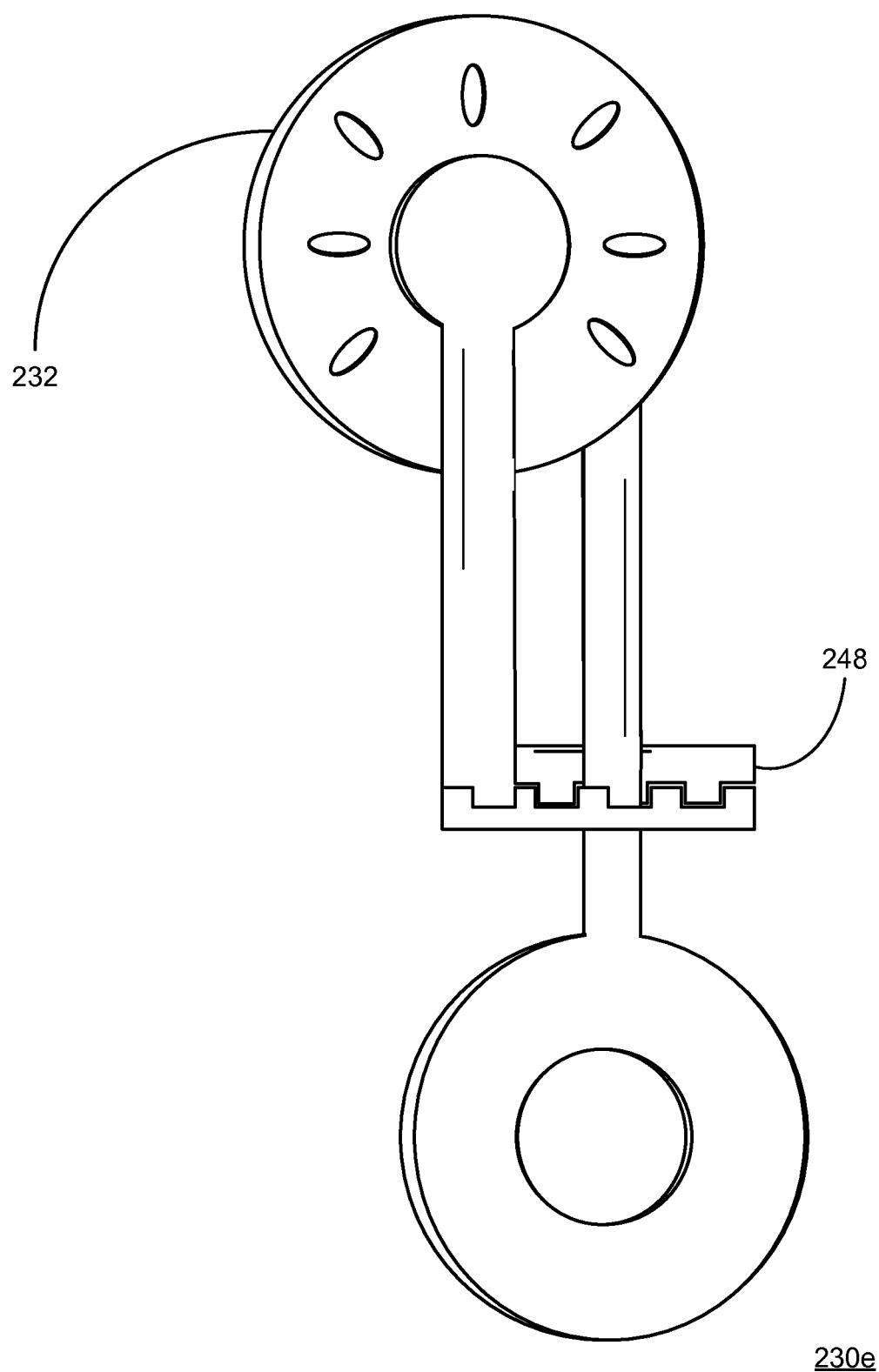

FIG. 2E is a side view of an adjustable riser 230e comprising a clamp 248 that may be used to lock the adjustable riser 230e in a fixed position. This prevents additional adjustments to the length of the adjustable riser 230e. Like the adjustable riser 230a, the adjustable riser 230e includes a reel 232. The clamp 248 tightens on the line to prevent additional reeling. A clamp may be used in a similar arrangement to lock the adjustable riser 230d with the pulley system. In other embodiments, the clamp 248 may prevent movement of the adjustment mechanism. In some embodiments, the clamp may bear the weight of the adjustable riser 230e and transmission line 110 to relieve a motor and/or adjustment mechanism from bearing the weight.

Figure 3:
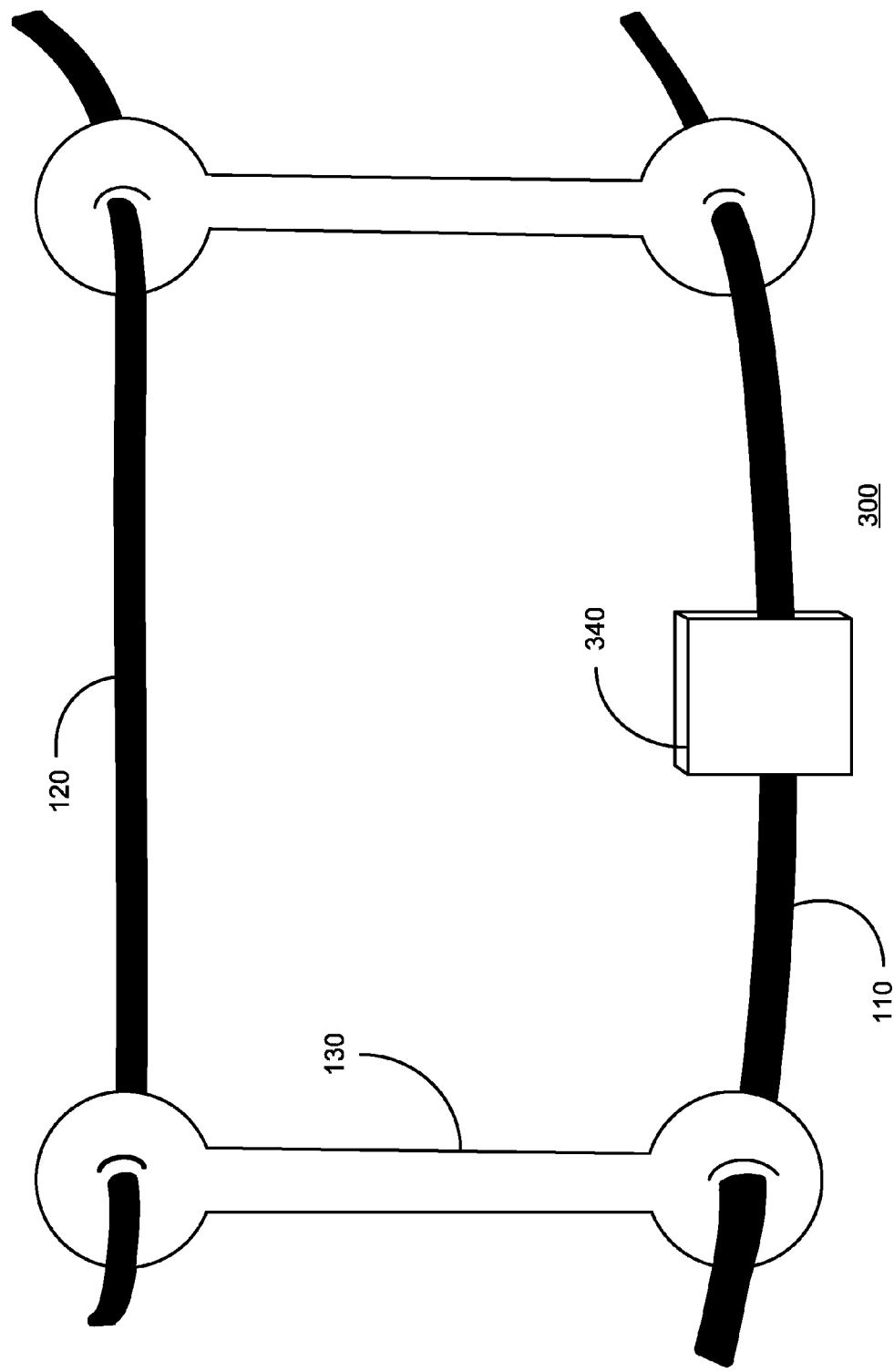
FIG. 3 is a side view of a transmission line support system comprising a sensor.

FIG. 3 is a side view of a transmission line support system 300 comprising a sensor 340. The sensor 340 may be used to detect the condition of the transmission line 110. The sensor 340 may be configured to detect environmental conditions that may cause sagging or swinging of the transmission line 110, such as the temperature or wind speed. Alternatively, the sensor 340 may measure the temperature of the transmission line 110 rather than the temperature of the environment.

The sensor 340 may measure other characteristics of the transmission line 110 as well or instead. For example, the sensor 340 may measure the electric current flowing through the transmission line 110. The sensor 340 can be configured as an ammeter in series with the transmission line 110 or configured to detect the magnetic field created by the transmission line 110 to measure the electric current. In some embodiments, the sensor 340 may measure the sag of the transmission line 110. The sag may be measured from the support line 120 or from the ground and/or foliage. The sensor 340 may comprise a unit to measure distance using ultrasonic or electromagnetic waves affixed to the support line 120 with a complementary reflector or transmitter affixed to the transmission line 110, or the measuring unit may be affixed to the transmission line 110 with the reflector or transmitter affixed to the support line 120. A camera or the like may use computer vision to estimate the sag of the transmission line 110.

The sensor 340 may also be used to measure lateral movement or swinging of the transmission line 110. The sensor 340 may comprise an accelerometer attached to the transmission line 110 to measure acceleration of the transmission line 110. Alternatively, the sensor 340 may be configured to measure the displacement of the transmission line. The displacement may be measured using a camera or the like or force sensors located where the transmission line 110 is attached to the support towers 101, 102.

There may be one sensor 340 per adjustable riser 130 or one sensor 340 for multiple adjustable risers 130. The sensor 340 may send measured data to the adjustable riser 130, which may process the data and adjust the length of the adjustable risers 130 based on the data. In other embodiments, the measured data may be sent to a central control station for processing. The adjustable risers 130 may then receive external commands from the central control station. A human or a computer may control the external commands. The external commands may be sent wirelessly to the adjustable riser 130 in some embodiments. Alternatively, the external commands may be sent over a wire. The wire may be the transmission line 110 or a separate wire.

The adjustable risers 130 may be adjusted to dampen or cancel swinging of the transmission line 110. In some embodiments, the adjustable risers 130 may be adjusted in coordination with the swinging of the transmission line 110 to cancel the swinging. The swinging of an adjustable length riser connected to a section of the transmission line can be approximately modeled as that of a variable length pendulum with a mass associated with the section of the transmission line which it supports. The length adjustment may be selected in accordance with optimization theory or can be performed heuristically (e.g., out of phase with the swinging), both of which techniques are discussed in Delgado et al., Controlling the Oscillations of a Variable Length Pendulum, Rev. Bras. Biom. 24 (4), p. 66 (2010), which is incorporated by reference. In other embodiments, the adjustable risers 130 may be adjusted at a frequency other than the resonant frequency and harmonics of the resonant frequency to reduce or cancel resonance. Alternatively, the adjustable risers 130 may be adjusted when the transmission line 110 is resonantly swinging to change the resonant frequency and stop the resonance.

Figure 4:
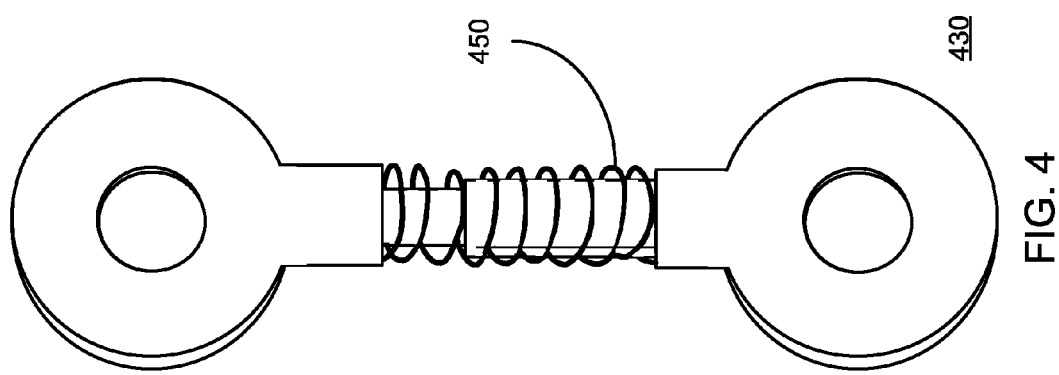
FIG. 4 is a side view of an adjustable riser comprising a shock absorber that may be used to reduce swinging of the transmission line.

FIG. 4 is a side view of an adjustable riser 430 comprising a shock absorber 450 that may also be used to reduce swinging of the transmission line 110. In some embodiments, the shock absorber may comprise a viscous damper. The shock absorber may comprise a fluid. The fluid may be an electrorheological fluid that allows the viscosity of the fluid in the shock absorber to be controlled. A linear electric generator may also be used to draw power from movement of the transmission line 110, thus damping swinging of the transmission line 110.

Figure 5:
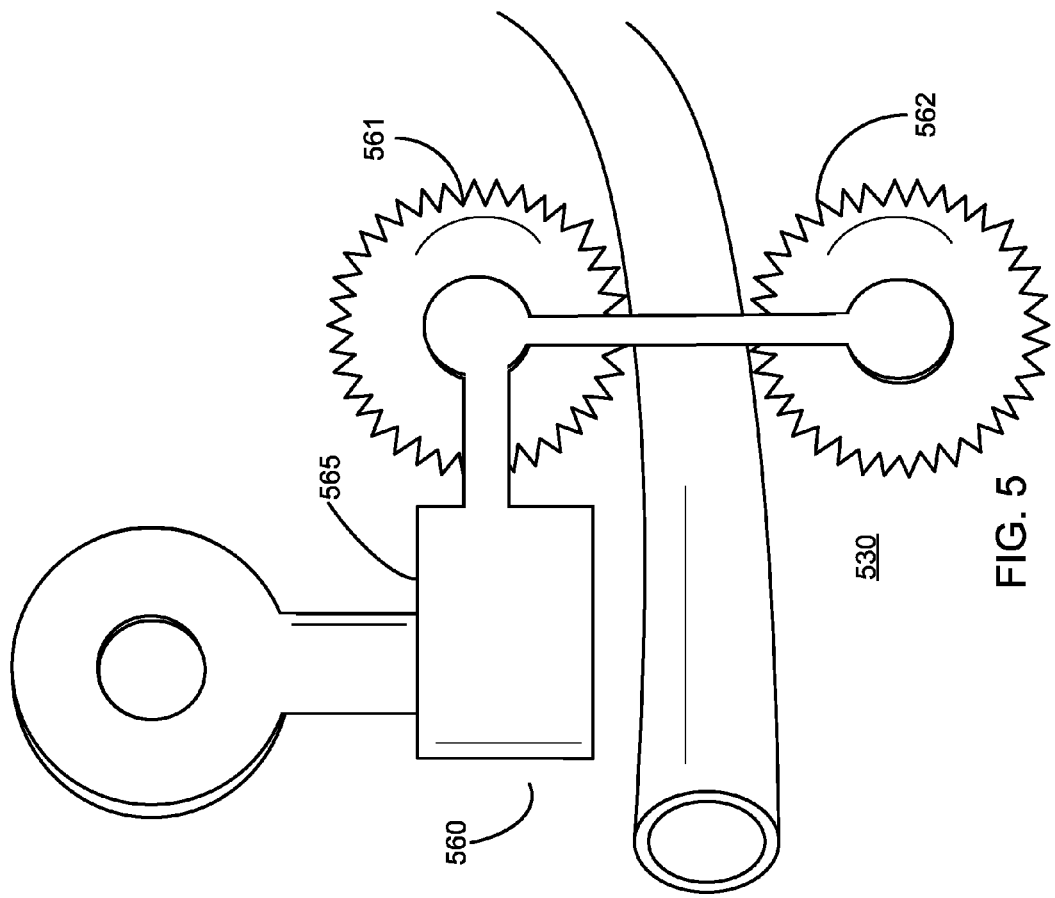
FIG. 5 is a side view of an adjustable riser comprising rollers for adjusting the position of the adjustable riser.

The adjustable risers 130 may be positioned during assembly of the support system 100, or a positioning mechanism may be used to adjust a location of the adjustable riser 130 along the support line 120 and/or the transmission line 110. FIG. 5 is a side view of an adjustable riser 530 comprising rollers 561, 562 for adjusting the location of the adjustable riser 530. The positioning mechanism 560 also comprises a motor 565 configured to rotate the rollers 561, 562, thus moving the adjustable riser 530 along the support line 120 and/or transmission line 110.

Various positioning configurations of the adjustable risers are possible, as seen in FIGS. 6A-D. In one embodiment, shown in FIG. 6A, the adjustable risers 130 in the support system 600a are equally spaced from one another and the support towers 101, 102. Alternatively, the adjustable risers 130 may be equally spaced from one another, but this spacing may be different from the spacing between the towers 101, 102 and the adjustable risers 130 closest to the towers 101, 102, as in the support system 600b shown in FIG. 6B.

Figure 6A:
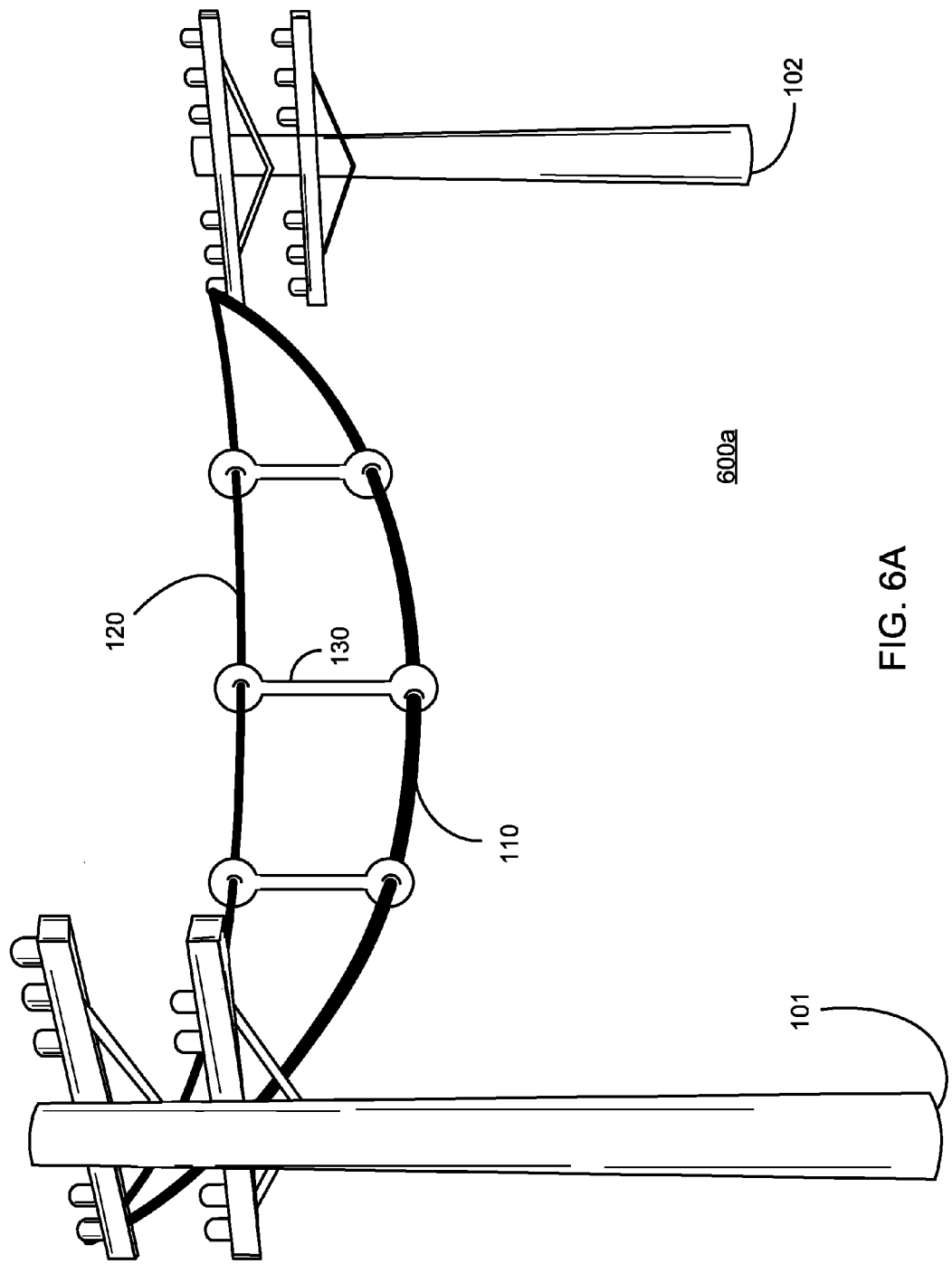
FIGS. 6A-D are side views of various positioning configurations of the adjustable risers.
Figure 6B:
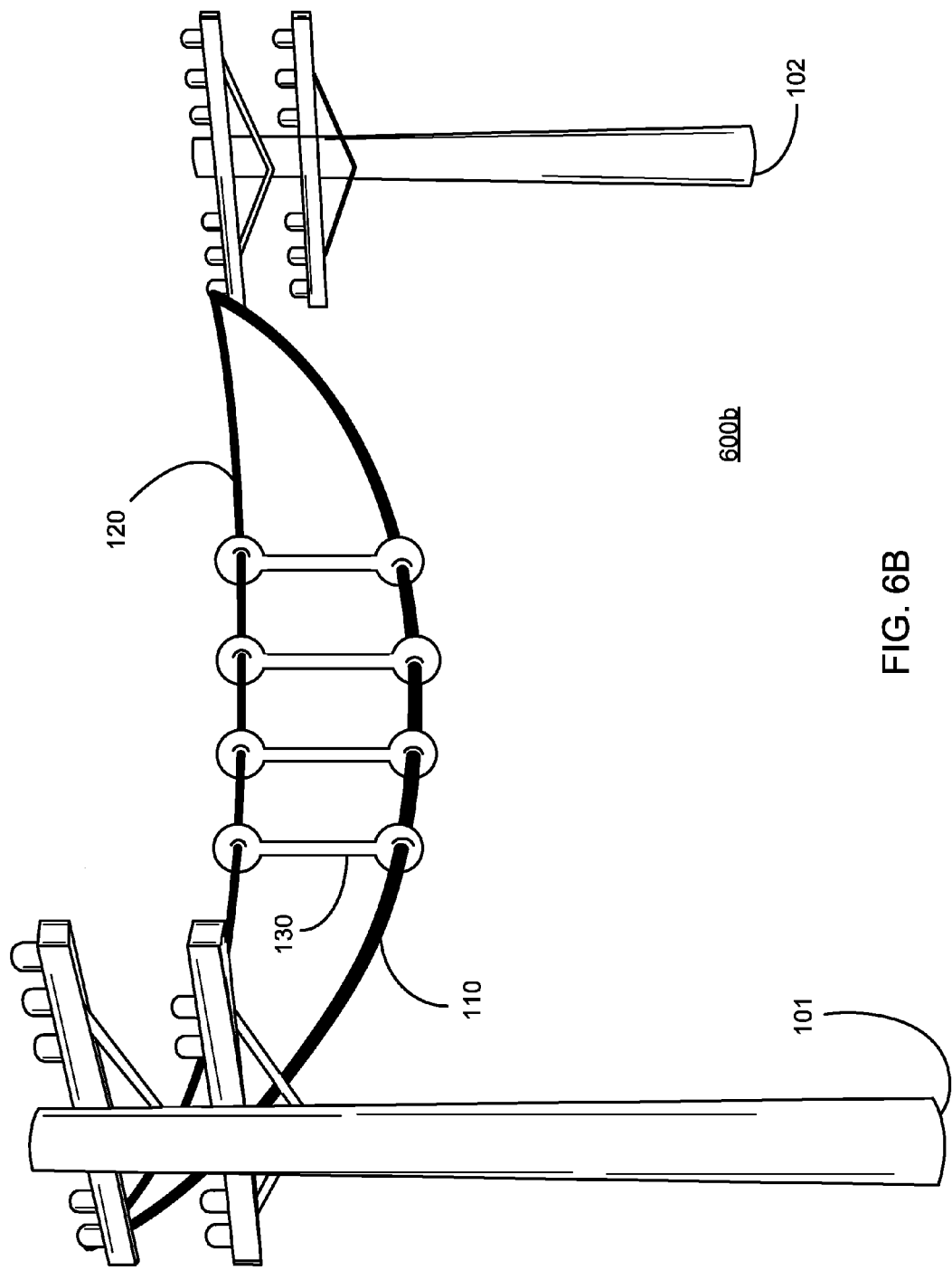
Figure 6C:
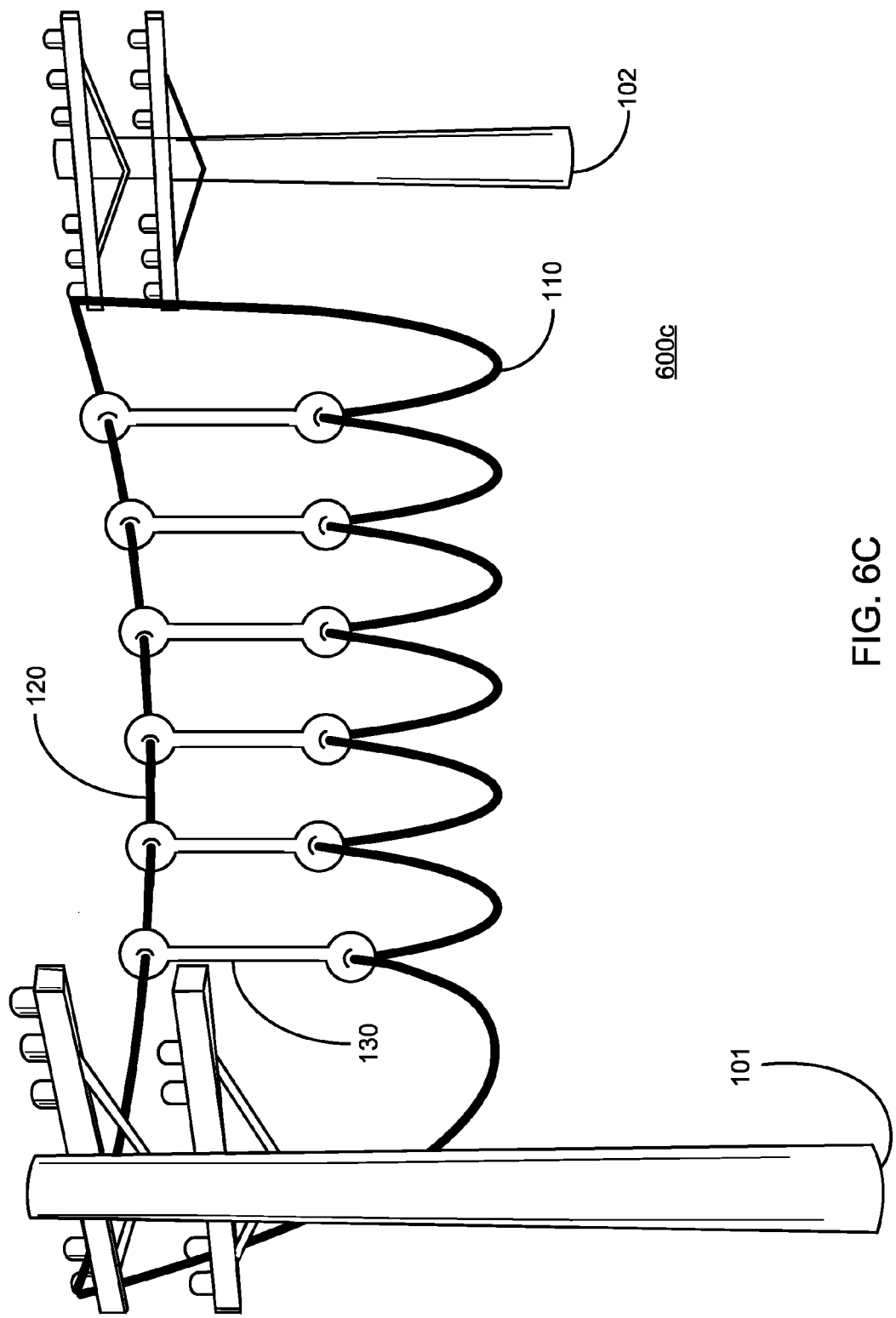
Figure 6D:
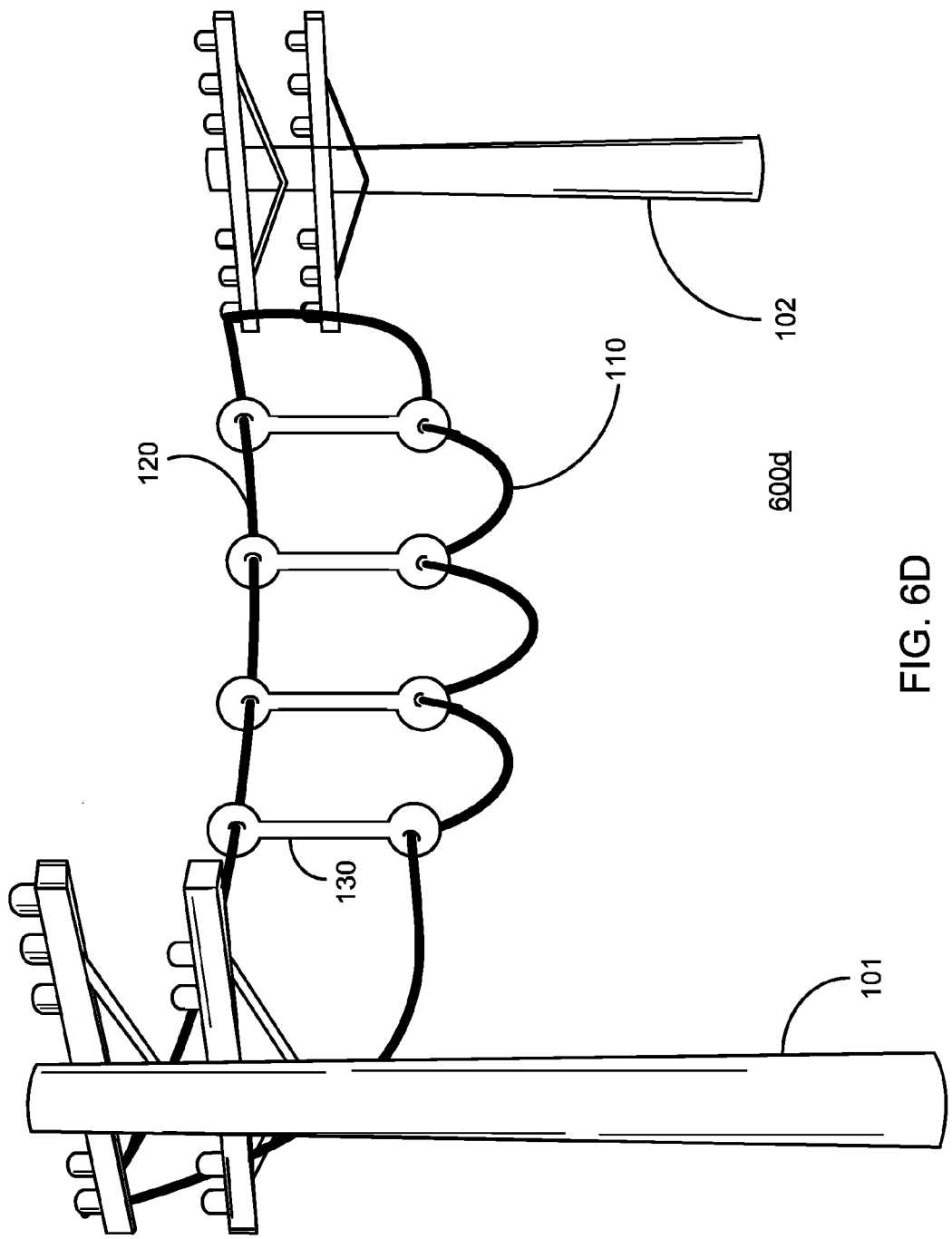

The adjustable risers 130 may be unequally spaced in some embodiments. For example, the adjustable risers 130 may be positioned to minimize sagging of the transmission line 110, such as to minimize the average sag or to minimize the maximum sag at any point along the transmission line 110. FIG. 6C is a side view of a support system 600c with the adjustable risers 130 positioned to minimize the maximum sag at any point along the transmission line 110. In other words, after the adjustable risers 130 have been positioned, the sag at the point of maximum sag is smaller than it would be under any other arrangement of the adjustable risers 130. FIG. 6D is a side view of a support system 600d with the adjustable risers 130 positioned to minimize the average sag of the transmission line 110. In the support systems 600c, 600d, the optimal position of the adjustable risers 130 may change with thermal expansion of the transmission line. Accordingly, positioning mechanisms may be used to move the adjustable risers 130 back into the optimal positions.

Different embodiments of the support line 120 are also contemplated. The support line 120 may comprise a material with a negative thermal expansion coefficient. The length of the support line 120 lessens as the temperature increases. This results in the sag of the support line 120 being reduced, which counteracts the increasing sag of the transmission line 110 resulting from the temperature rise. Alternatively, the thermal expansion coefficient of the support line 120 may be selected to be less than the thermal expansion coefficient of the transmission line 110. The support line 120 may comprise a high-tensile-strength material. Sag of the support line 120 can then be minimized by placing the support line 120 under very high tension. Exemplary materials include, but are not limited to: metals, such as steel, aluminum, and titanium; polymers, such as polyamides, ultra-high-molecular-weight polyethylene, polybenzoxazoles, and carbon-fiber-reinforced polymers; other inorganic compounds, such as boron nitride, aluminum (III) oxide, and fiberglass; and carbon fiber. In some embodiments, the support line 120 may also include a shock absorber.

Figure 7:
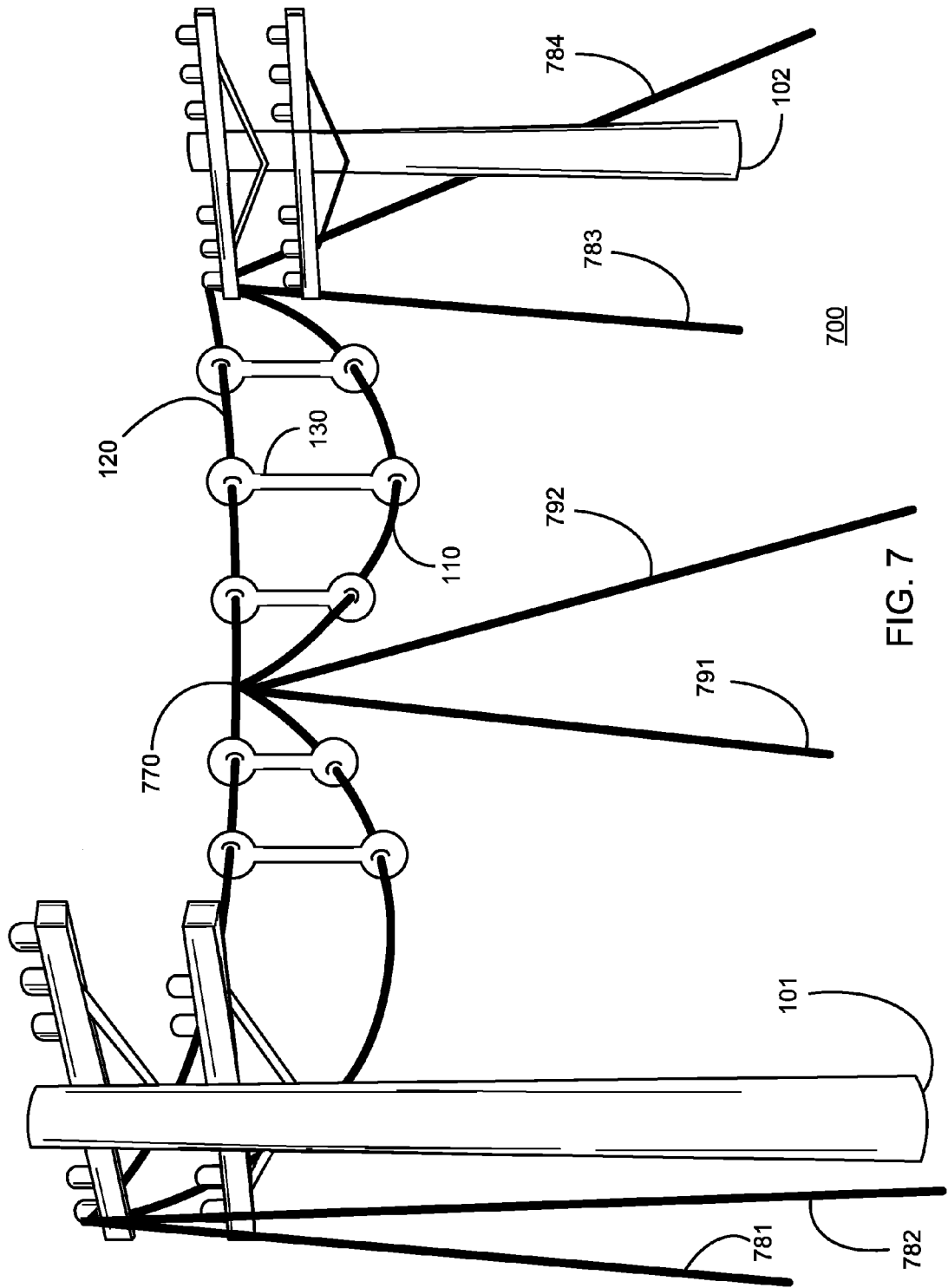
FIG. 7 is a side view of a support system where the transmission line has been coupled directly to the support line with a zero gap connection located at an intermediate support point.

FIG. 7 is a side view of a support system 700 where the transmission line 110 has been coupled directly to the support line 120 with a zero gap connection 770 located at an intermediate support point. The intermediate support point may be equidistant from the support towers 101, 102. Sometimes, the elevation of the point where the support line 120 and the transmission line 110 are coupled to the first support tower 101 is different from the elevation of the point where the support line 120 and the transmission line 110 are coupled to the second tower 102. In those instances, it can be advantageous to have the zero gap connection 770 located closer to the lower elevation tower. The zero gap connection 770 can be implemented with an adjustable riser 130 adjusted to reduced length. In some embodiments, this may comprise an adjustable riser 130 that has been reduced in length until both ends are in physical contact with each other. More than one zero gap connection 770 is also possible.

The support system 700 also comprises guy wires 781, 782, 783, 784, 791, 792. In the illustrated embodiment, some guy wires 781, 782, 783, 784 are coupled to the support line 120 where it connects to the support towers 101, 102. These guy wires 781, 782, 783, 784 may provide tension to the support line 120. This may relieve the support towers 101, 102 from the stress that would otherwise be placed on them by the support line. Other guy wires 791, 792 are coupled to the support line 120 at the intermediate support point. These guy wires 791, 792 may stabilize the support line 120 against wind and other lateral forces. In some embodiments, the guy wires 791, 792 may be affixed to the intermediate support point even without a zero gap connection 770. The guy wires 781, 782, 783, 784, 791, 792 may be directly or indirectly coupled to the ground. The guy wires 781, 782, 783, 784, 791, 792 may also comprise shock absorbers. Each shock absorber may comprise a viscous damper and/or a fluid. In some embodiments, the fluid may be an electrorheological fluid.

In some instances, support systems may comprise more than one support line 120 and/or more than one transmission line 110. In these instances, various arrangements of the support lines and the transmission lines are possible. Arrangements may include more than one support line supporting a single transmission line, a single support line supporting more than one transmission line, or a combination thereof. FIGS. 8A-D are cross-section views of support systems 800a-d arranged in different ways.

The support system 800a shown in FIG. 8A comprises a single support line 120 supporting two transmission lines 811a, 812a. The system 800a comprises adjustable risers 831a connecting the support line 120 to the first transmission line 811a and adjustable risers 832a connecting the first transmission line 811a to the second transmission line 812a. In some embodiments, the risers 832a between the transmission lines 811a, 812a may not be adjustable. In other embodiments, the risers 831a between the support line 120 and the first transmission line 811a may not be adjustable.

In FIG. 8B, a support system 800b comprises a plurality of support lines 821b, 822b that are substantially parallel to a single transmission line 110 and at a same height above the transmission line 110. Also, the transmission line 110 is a same distance from each of the plurality of support lines 821b, 822b. Adjustable risers 831b, 832b couple the transmission line 110 to each of the support lines 821b, 822b. In the illustrated embodiment, an acute angle is formed by the adjustable risers 831b, 832b. In other embodiments, a right angle or an obtuse angle may be formed by the adjustable risers 831b, 832b. The adjustable risers 831b, 832b may be affixed to one another to prevent the angle from changing.

Figure 8C:
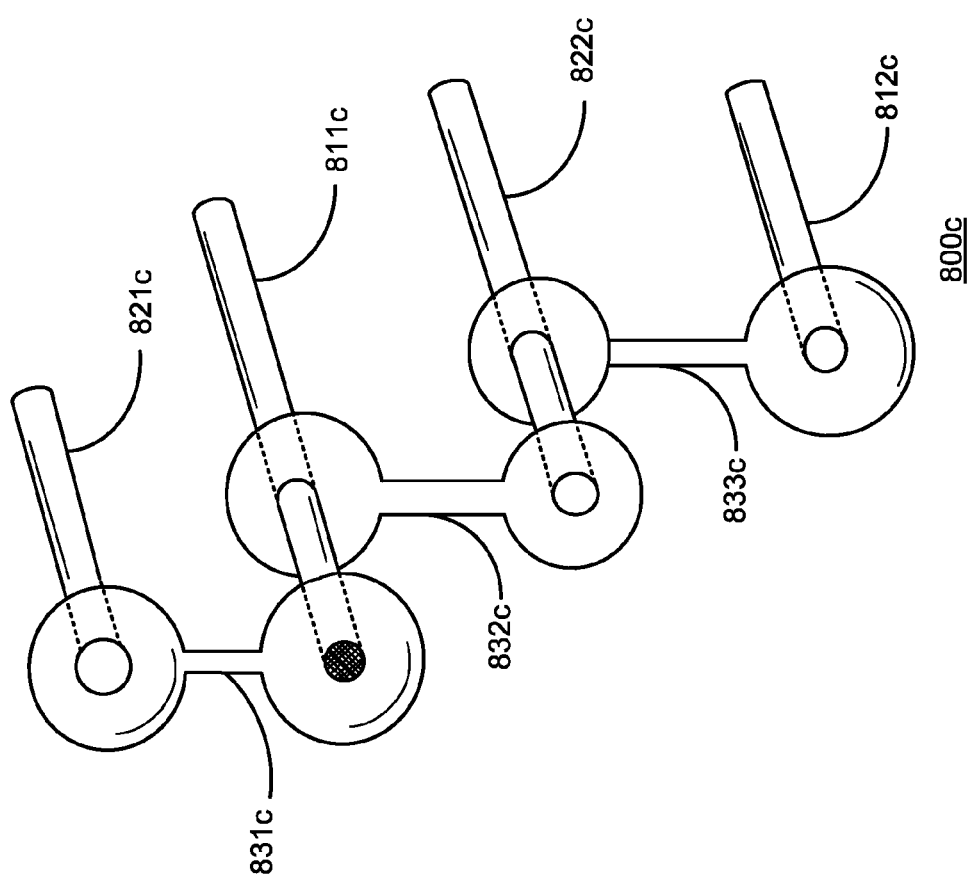

The support system 800c of FIG. 8C comprises a plurality of support lines 821c, 822c supporting a plurality of transmission lines 811c, 812c. In this embodiment, a first support line 821c is directly above a first transmission line 811c and supports the first transmission line 811c with adjustable risers 831c. The first transmission line 811c is directly above a second support line 822c and is coupled to the second support line 822c with adjustable risers 832c. The second support line 822c is directly above a second transmission line 812c and supports the second transmission line 812c with adjustable risers 833c. The adjustable risers 832c between the second support line 822c and the first transmission line 811c may be compression bearing members, whereas the other adjustable risers 831c, 833c may be tension bearing members. In other embodiments, additional support lines and/or transmission lines may be directly in line with the two support lines and the two transmission lines. Alternatively, there may be multiple groups of support lines and transmission lines in line with each other.

Figure 8D:
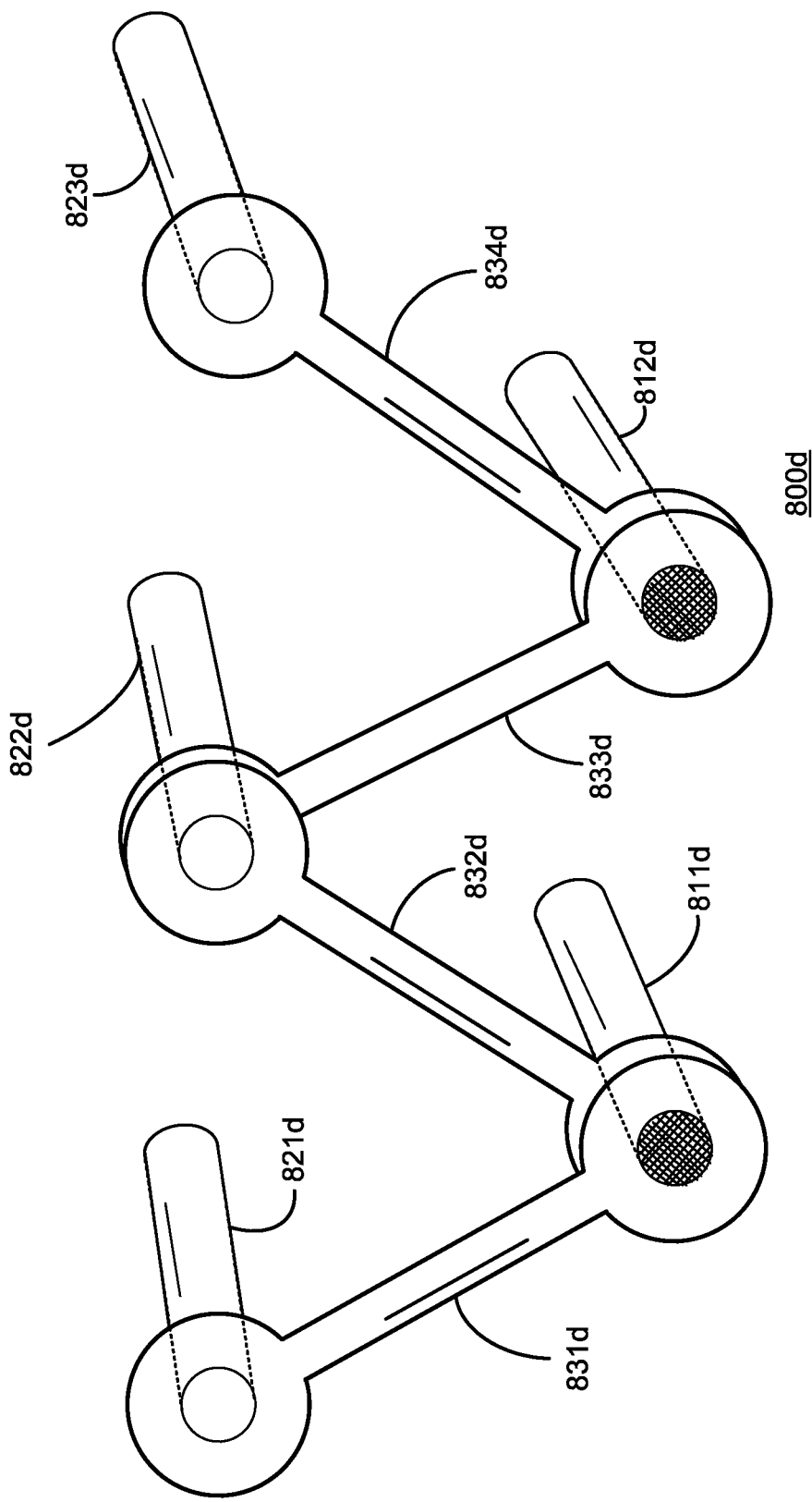

In FIG. 8D, a support system 800d comprises three support lines 821d, 822d, 823d, and two transmission lines 811d, 812d. The support lines 821d, 822d, 823d may be substantially parallel to the transmission lines 811d, 812d and at a same height above the transmission lines 811d, 812d. Additionally, the first transmission line 811d may be a same distance from the first and second support lines 821d, 822d, and the second transmission line 812d may be a same distance from the second and third support lines 822d, 823d. Adjustable risers 831d, 832d couple the first transmission line 811d to the first and second support lines 821d, 822d. Also, adjustable risers 833d, 834d couple the second transmission line 812d to the second and third support lines 822d, 823d. In the illustrated embodiment, the angles between the adjustable risers 831d, 832d, 833d, 834d are acute. In other embodiments, the angles may be right angles or obtuse angles. The adjustable risers 831d, 832d, 833d, 834d may be configured to prevent the angles from changing.

The aforementioned arrangements are a few exemplary arrangements. Many other arrangements are possible and in some instance may be extrapolations or combinations of the above arrangements. Generally, a support system may comprise m support lines and n transmission lines, where m and n represent numbers greater than or equal to one. In some embodiments, it is advantageous to have n be less than m, i.e., to have at least as many support lines as transmission lines.

Figure 9:
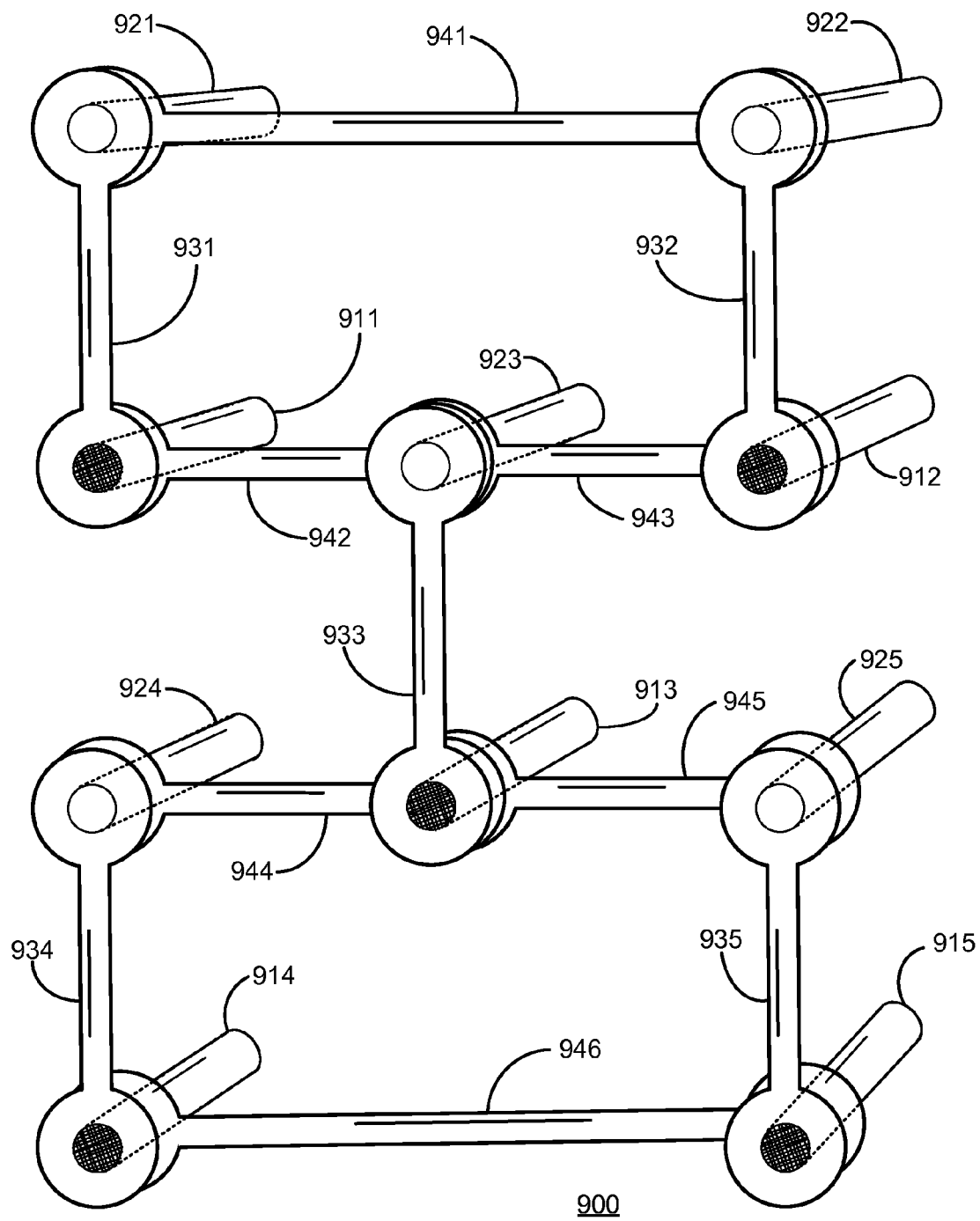
FIG. 9 is a cross-section view of a support system comprising a plurality of support lines and a plurality of transmission lines with lateral members to stabilize the system.

Additional connections between the support lines and/or transmission lines are possible. This may comprise adjustable risers connecting two support lines to each other or two transmission lines to each other. Alternatively, lateral members may be placed between support lines and/or transmission lines. FIG. 9 is a cross-section view of a support system 900 that comprises a plurality of support lines 921, 922, 923, 924, 925 and a plurality of transmission lines 911, 912, 913, 914, 915. In the illustrated embodiment, each support line 921, 922, 923, 924, 925 is connected to a single transmission line 911, 912, 913, 914, 915 by adjustable risers 931, 932, 933, 934, 935. Additionally, lateral members 941, 942, 943, 944, 945, 946 are used to reduce swinging and/or prevent contact of the support lines 921, 922, 923, 924, 925 and the transmission lines 911, 912, 913, 914, 915.

One lateral member 941 connects two support lines 921, 922 together. Another lateral member 946 connects two transmission lines 914, 915 together. The remaining lateral members 942, 943, 944, 945 connect support lines 923, 924, 925 to transmission lines 911, 912, 913. The lateral members 941, 942, 943, 944, 945, 946 may be configured to resist tension, compression, and/or rotation. Thus, the lateral members 941, 942, 943, 944, 945, 946 may comprise a tension bearing member, a compression bearing member, and/or a moment bearing member. In some embodiments, one or more of the lateral members may have adjustable lengths. In some embodiments, one or more of the lateral members may comprise electrical insulators. In some embodiments, a single material or member may be configured to serve multiple purposes.

It will be obvious to those having skill in the art that many changes may be made to the details of the above-described embodiments without departing from the underlying principles of the disclosure. The scope of the present disclosure should, therefore, be determined only by the following claims.

The invention claimed is:

1. A system for supporting n overhead transmission lines to mitigate sagging or swinging of the transmission lines, the system comprising:

m support lines; and a plurality of adjustable risers, wherein each of the m support lines is coupled to at least one of the n overhead transmission lines by at least one adjustable riser, wherein each of the n transmission lines is coupled to at least one of the m support lines by at least one adjustable riser, wherein at least one of the m support lines is higher than one of the n overhead transmission lines and at least another of the m support lines is lower than the one of the n overhead transmission lines, wherein a length of at least one of the plurality of adjustable risers is dynamically adjustable between a first length and a second length, and wherein n<m.

2. The system of claim 1, wherein at least one of the plurality of adjustable risers comprises a first end coupled to one of the n overhead transmission lines and a second end coupled to another of the n overhead transmission lines.

3. The system of claim 1, wherein each of a subset of the m support lines is a same distance from a first of the n transmission lines.

4. The system of claim 3, wherein each of the subset of m support lines is at a same height above the first transmission line.

5. The system of claim 4, wherein each of the n transmission lines is at a same height, wherein each of the m support lines is at a same height, and wherein each transmission line is coupled to a pair of support lines.

* * * * *